(12) United States Patent
Stewart et al.

(10) Patent No.: US 11,088,373 B2
(45) Date of Patent: Aug. 10, 2021

(54) SEAL FOR SOLID POLYMER ELECTROLYTE FUEL CELL

(71) Applicant: BALLARD POWER SYSTEMS INC., Burnaby (CA)

(72) Inventors: Ian Stewart, Vancouver (CA); Darcy McGowan, Vancouver (CA); Emerson Gallagher, Vancouver (CA)

(73) Assignee: BALLARD POWER SYSTEMS INC., Burnaby (CA)

( * ) Notice: Subject to any disclaimer, the term of this patent is extended or adjusted under 35 U.S.C. 154(b) by 240 days.

(21) Appl. No.: 15/550,758

(22) PCT Filed: Feb. 11, 2016

(86) PCT No.: PCT/US2016/017516
§ 371 (c)(1),
(2) Date: Aug. 11, 2017

(87) PCT Pub. No.: WO2016/130781
PCT Pub. Date: Aug. 18, 2016

(65) Prior Publication Data
US 2018/0034074 A1 Feb. 1, 2018

Related U.S. Application Data

(60) Provisional application No. 62/115,548, filed on Feb. 12, 2015.

(51) Int. Cl.
*H01M 8/0273* (2016.01)
*H01M 8/028* (2016.01)
(Continued)

(52) U.S. Cl.
CPC ....... *H01M 8/0273* (2013.01); *B29C 45/0046* (2013.01); *B29C 45/14344* (2013.01);
(Continued)

(58) Field of Classification Search
CPC .................................................. H01M 8/0273
See application file for complete search history.

(56) References Cited

U.S. PATENT DOCUMENTS

| 6,057,054 A | 5/2000 | Barton et al. |
| 2005/0089746 A1 | 4/2005 | James et al. |
| (Continued) | | |

FOREIGN PATENT DOCUMENTS

| CN | 1 536 698 A | 10/2004 |
| EP | 1 156 546 A1 | 11/2001 |
| (Continued) | | |

*Primary Examiner* — Stephan J Essex
(74) *Attorney, Agent, or Firm* — Seed Intellectual Property Law Group LLP

(57) ABSTRACT

A sealed membrane electrode assembly (MEA) and a method of sealing the MEA comprises the steps of providing a frame around a periphery of the MEA to form a framed MEA; providing a through-hole in the frame; placing the framed MEA into a seal mold, the seal mold comprising a reservoir region, a seal bead region, and at least one runner region; feeding a flow-processable seal material into the reservoir region in the seal mold that is aligned with the throughhole in the frame; feeding the flow-processable seal material from the reservoir region to the seal bead region through the at least one runner region; wherein a hydraulic diameter of the at least one runner region is less than a hydraulic diameter of the reservoir region.

16 Claims, 3 Drawing Sheets

(51) Int. Cl.
    *H01M 8/0286*    (2016.01)
    *B29C 45/14*     (2006.01)
    *B29C 45/00*     (2006.01)
    *B29K 21/00*     (2006.01)

(52) U.S. Cl.
    CPC ......... *H01M 8/028* (2013.01); *H01M 8/0286* (2013.01); *B29K 2021/006* (2013.01)

(56) References Cited

U.S. PATENT DOCUMENTS

| | | | |
|---|---|---|---|
| 2007/0202381 A1* | 8/2007 | Diaz | H01M 8/0273 429/434 |
| 2009/0202884 A1* | 8/2009 | Morimoto | H01M 8/0273 429/494 |
| 2009/0220834 A1 | 9/2009 | Schaack et al. | |

FOREIGN PATENT DOCUMENTS

| | | |
|---|---|---|
| EP | 2 058 883 A1 | 5/2009 |
| EP | 2 916 046 A1 | 9/2015 |
| JP | 2004-319461 A | 11/2004 |
| JP | 2011-096545 A | 5/2011 |
| WO | 2014/069172 A1 | 5/2014 |

\* cited by examiner

SEAL FOR SOLID POLYMER ELECTROLYTE FUEL CELL

BACKGROUND

Technical Field

The present invention relates to sealed membrane electrode assemblies and to methods of providing seals to membrane electrode assemblies.

Description of the Related Art

Fuel cells are devices in which fuel and oxidant fluids electrochemically react to generate electricity. A type of fuel cell being developed for various commercial applications is the solid polymer electrolyte fuel cell, which employs a membrane electrode assembly (MEA) comprising a solid polymer electrolyte made of a suitable ionomer material (e.g., Nation®) disposed between two electrodes. Each electrode comprises an appropriate catalyst located next to the solid polymer electrolyte. The catalyst may be, for example, a metal black, an alloy, or a supported metal catalyst such as platinum on carbon. The catalyst may be disposed in a catalyst layer, and the catalyst layer typically contains ionomer, which may be similar to that used for the solid polymer electrolyte. A fluid diffusion layer (a porous, electrically conductive sheet material) is typically employed adjacent to the electrode for purposes of mechanical support, current collection, and/or reactant distribution. In the case of gaseous reactants, such a fluid diffusion layer is referred to as a gas diffusion layer. If a catalyst layer is incorporated onto a gas diffusion layer, the unit is referred to as a gas diffusion electrode.

For commercial applications, a plurality of fuel cells are generally stacked in series in order to deliver a greater output voltage. Separator plates are typically employed adjacent the gas diffusion electrode layers in solid polymer electrolyte fuel cells to separate one cell from another in a stack. Fluid distribution features, including inlet and outlet ports, fluid distribution plenums and numerous fluid channels, are typically formed in the surface of the separator plates adjacent the electrodes in order to distribute reactant fluids to, and remove reaction by-products from, the electrodes. Separator plates also provide a path for electrical and thermal conduction, as well as mechanical support and dimensional stability to the MEA.

In an assembled fuel cell, the porous gas diffusion layers in the MEA must be adequately sealed at their periphery and to their adjacent separator plates in order to prevent reactant gases from leaking over to the wrong electrode or to prevent leaks between the reactant gases and the atmosphere surrounding the fuel cell stack. This can be challenging because the MEA is typically a relatively large, thin sheet, and thus a seal may be needed over a significant perimeter, and a fuel cell stack typically involves sealing numerous MEAs. Conventionally then, the design of the MEA edge seal should provide for production in high volume and for reliable, high quality leak-tight seals. Various ways of accomplishing this have been suggested in the art.

One prior art sealing method involves the use of a sealing gasket which surrounds the MEA and which can be significantly compressed between the anode and cathode separator plates in order to effect a reliable seal between the MEA and ambient. A seal separating the anode from the cathode can be obtained by impregnating gasket seal material into the edges of the MEA and attaching or integrating these impregnated edges to the surrounding gasket. U.S. Pat. No. 6,057,054 discloses such an embodiment using flush-cut MEAs (in which the edges of the membrane electrolyte, electrodes, and gas diffusion layers are aligned and terminate at the same location, i.e., at the flush cut edge). However, such an approach generally requires the same material to be used for edge impregnating as well as gasket, and further can require tight tolerances and hence production difficulties.

Other prior art sealing methods can employ more than one compressible gasket to effect the required seals. For instance, embodiments employing framed MEAs have been suggested in which the frames are not bonded to a surrounding single gasket but are instead sandwiched between two surrounding compressible gaskets. Thus, one surrounding gasket seals an anode between the anode frame and the adjacent separator plate, while the other surrounding gasket seals the cathode between the cathode frame and its adjacent separator plate. Difficulties can arise however if the opposing gaskets are out of alignment with respect to each other, and thus again, tight tolerances can be required.

In some prior sealing methods, a multicomponent sealing rim may be used to seal the edge of the MEA. U.S. Patent Publication No. 2009/0220834 discloses that a frame may be applied to the edge of the MEA, with the rim components being joined by means of two different joining methods. The rim construction of the MEA comprises at least two materials (sealing material A and frame B) which are joined to one another both by adhesion and by physical locking. The frame B has at least one perforation through which the sealing material penetrates and establishes an intermeshing connection. If a plurality of perforations are provided, the typical distances between them are in the range of 0.1 to 100 mm. The number and size of the perforations in the frame will depend on the required strength of the adhesive connection between the individual components. In this seal construction, both the sealing material A and frame B are in contact with at least one of the MEA components. The sealing material A may be a thermoplastic polymer, a thermoset polymer, or an elastomer, such as silicone rubber.

However, some seal materials such as silicone have been shown to contaminate the membrane electrode assembly. For example, U.S. Patent Publication No. 2005/0089746 suggests that when silicones are used as a sealant material, mobile siloxanes may migrate into the membrane where they may then be chemically oxidized to form silicon dioxide derivatives. This contamination may subsequently lead to internal fractures within the membrane and ultimate failure of the fuel cell. Furthermore, injection molding of liquid-injectable materials onto sealing frames is difficult to control and difficult to accurately throttle the distribution of the liquid-injectable material in the mold. Therefore, there remains a need for improved methods of forming multicomponent or composite seals using liquid-injection moldable materials while physically separating silicone and other seal materials that degrade in the fuel cell environment from the MEA.

BRIEF SUMMARY

The invention is applicable to solid polymer electrolyte fuel cells which include a membrane electrode assembly including an ionomer electrolyte disposed between an anode and a cathode.

In one embodiment, a method of sealing the membrane electrode assembly includes providing a frame around a periphery of the membrane electrode assembly to form a framed membrane electrode assembly, the frame including a first side and an opposing second side, providing a through-hole in the frame, wherein the through-hole is spaced away from the membrane electrode assembly, placing the framed membrane electrode assembly into a seal mold, the seal mold including a reservoir region, a seal bead region, and at least one runner region that fluidly connects the reservoir region to the seal bead region; feeding a flow-processable seal material into the reservoir region in the seal mold that is aligned with the through-hole in the frame, wherein the liquid-injectable seal material is fed through the through-hole to the first and second sides of the frame, feeding the flow-processable seal material from the reservoir region to the seal bead region through the at least one runner region, thereby forming at least one runner and a seal bead on the first side of the frame, wherein a hydraulic diameter of the at least one runner region is less than a hydraulic diameter of the reservoir region. The frame includes a thermoplastic material. The flow processable seal material includes a thermosetting liquid injection moldable compound.

The method includes forming at least one runner and a seal bead on the opposing second side of the frame. The runner(s) and the seal bead on the opposing second side of the frame are formed simultaneously with the runner(s) and the seal bead on the first side of the frame.

In some embodiments, providing the frame around the periphery of the membrane electrode assembly includes bonding a plurality of frame members to the periphery of the membrane electrode assembly.

The frame forms at least one manifold on the periphery of the framed membrane electrode assembly. The through-hole in the frame is offset from the membrane electrode assembly and from manifolds. The seal bead formed on the frame through the present method circumscribes the manifolds in the frame. The reservoir, the runner(s) and the seal bead are physically separated from the membrane electrode assembly.

In preferred embodiments, the runners and the reservoir are shorter in cross-sectional height than the seal bead. For example, the cross-sectional height of at least one runner can be less than about half of the cross-sectional height of the seal bead.

The method further includes curing the liquid-injectable seal material.

The invention also discloses a sealed membrane electrode assembly for a fuel cell including a frame provided around a periphery of a membrane electrode assembly to form a framed membrane electrode assembly, the frame including a first side and an opposing second side, a through-hole in the frame, which is spaced away from the membrane electrode assembly, a reservoir in the through-hole extending from the first side to the opposing second side of the frame, and at least one runner and a seal bead on the first side of the frame, the runner and the seal bead being made of a flow processable seal material. The hydraulic diameter of each runner is less than the hydraulic diameter of the reservoir. The frame of the framed membrane electrode assembly is preferably made of a thermoplastic material. The flow processable seal material for the runner and the seal bead can include a thermosetting liquid injection moldable compound.

Each runner and each reservoir of the framed membrane electrode assembly is preferably shorter in cross-sectional height than the cross-sectional height of the seal bead, preferably they have a cross-sectional height of less than about half of the cross-sectional height of the seal bead to which they are connected.

The sealed membrane electrode assembly further comprises at least one manifold in the frame on the periphery of the membrane electrode assembly, and the seal bead circumscribes each manifold.

In preferred embodiments, the through-hole is offset from the membrane electrode assembly and from the manifolds.

In preferred embodiments, the sealed membrane electrode assembly also includes at least one runner and a seal bead on the opposing second side of the frame.

These and other aspects of the invention will be evident in view of the attached figures and the following detailed description.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is, as "including but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned in U.S. Patent Publication No. 2005/0089746, flow processable elastomers, such as silicones, may not be chemically stable within the acidic, oxidative and reductive environment found in a fuel cell, particularly over the fuel cell lifetime. In particular, degradation appeared to be localized within the region of the MEA where the sealant material is in close proximity to the active area of the MEA. Therefore, it is preferable to physically separate the flow processable elastomer from the MEA, and more specifically, away from the electrode and the ionomer membrane.

Figure 1:
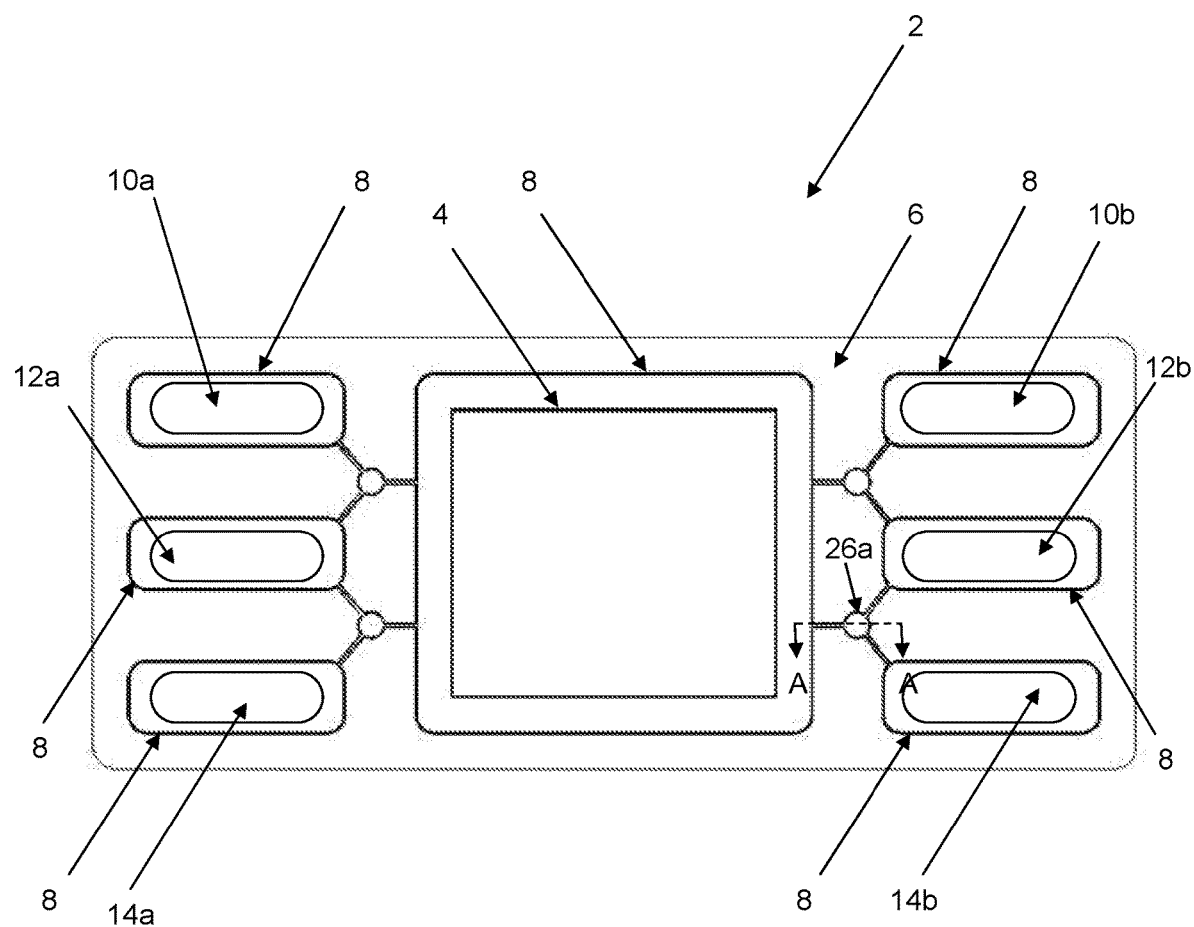
FIG. 1 is a planar view of an exemplary framed membrane electrode assembly on the anode side including frame members and manifolds, with an elastomeric seal on the frame members.

FIG. 1 shows a planar view of a framed MEA 2. Framed MEA 2 has an MEA 4 comprising an ionomer electrolyte disposed between an anode and a cathode and a frame 6 with an elastomeric seal 8 on its surface. In FIG. 1, one side of the MEA is shown, for example the anode side. Frame 6 fluidly seals a peripheral edge of MEA 4 around its active area so that the reactants are isolated to each side of the MEA, and also electrically isolates the anode from the cathode, as well as between adjacent MEAs in a fuel cell stack. Frame 6 also forms manifolds 10*a*, 10*b*, 12*a*, 12*b*, 14*a*, 14*b* that provide and exhaust the reactants, reaction by-products, and coolant to and from MEA 4. Elastomeric seal 8 is formed on the surface of frame 6 and circumscribes the active area of MEA 4, as well as around each of manifolds 10*a*, 10*b*, 12*a*, 12*b*, 14*a*, 14*b*, to fluidly seal against an adjacent anode separator (not shown) when forming a fuel cell. By sealing the periphery of the MEA with a thermoplastic frame, and then providing an elastomeric seal bead on the frame so that the elastomeric material is physically separated from the MEA, MEA degradation due to degradation of the elastomeric material of the seal is substantially reduced.

Figure 2:
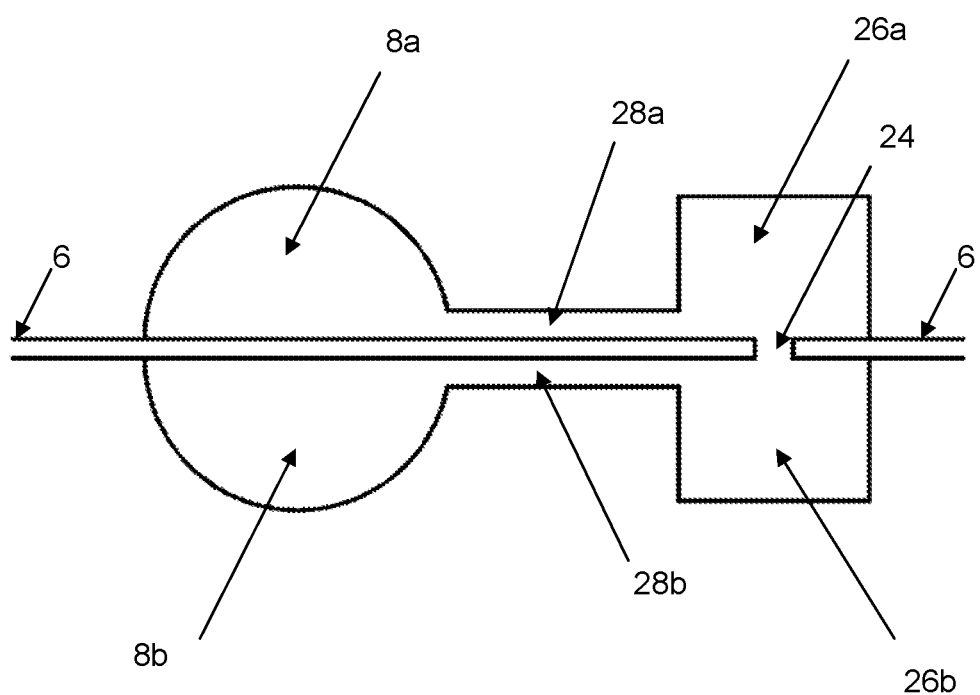
FIG. 2 is a schematic cross-sectional drawing of an exemplary seal region through A-A of the framed membrane electrode assembly with an elastomeric seal on the frame members.

FIG. 2 is a cross-section of the seal region at section A-A in FIG. 1. As will be discussed in later sections, a through-hole 24 is formed through frame 6, which is filled with a flow processable seal material and forms reservoirs 26*a*, 26*b* on the first side and opposing second side of frame 6. In some embodiments, frame 6 can have a layered construction made of two or more superimposed frame members which are bonded to the periphery of the membrane electrode assembly. Runners 28*a*, 28*b* are also formed from the same flow processable seal material on frame 6, that extend from reservoirs 26*a*, 26*b* to elastomeric seal beads 8*a*, 8*b*. Through-hole 24 is offset from (i.e., not aligned with) MEA 4 and the manifolds provided in the frame 6.

To form a framed MEA, frame 6 is first placed on either side of the MEA on a peripheral edge thereof, and then bonded by heat and/or pressure to form the framed MEA. A through-hole is provided in the frame in a location away from the MEA and the manifolds. The through-hole may be provided before or after bonding, though alignment is more difficult if the through-hole was formed before bonding. The framed MEA is then placed into a seal mold for injection-molding the flow-processable material onto the frame.

Figure 3:
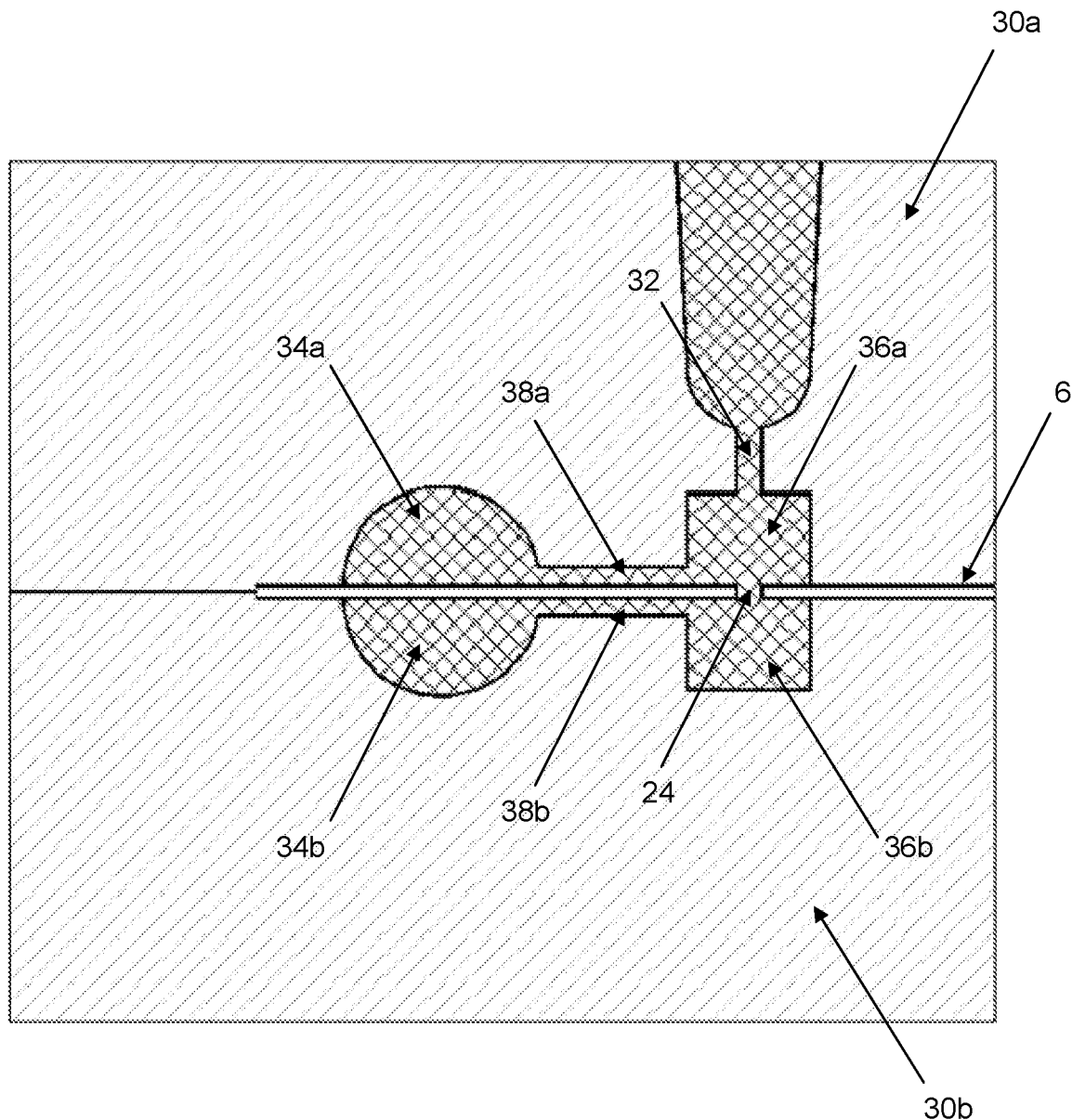
FIG. 3 is a schematic cross-sectional drawing of an exemplary seal mold for forming an elastomeric seal bead on the frame members of a framed membrane electrode assembly.

FIG. 3 shows a cross-sectional view of an exemplary seal mold 30*a*, 30*b* for forming the elastomeric seal bead on the framed MEA. A feeding slot 32 is provided for feeding a flow processable seal material through through-hole 24 of frame 6 to seal regions 34*a*, 34*b* through reservoir regions 36*a*, 36*b* and runner regions 38*a*, 38*b*. The resulting seal for an MEA includes a reservoir that is aligned with the through-hole of the frame, a plurality of runners that are fluidly connected to the reservoir on both sides of the frame and, an elastomeric seal bead fluidly connected to at least one of the runners. The elastomeric seal bead circumscribes the MEA and/or the manifolds, as shown in FIG. 1.

As mentioned in the foregoing, injection molding of flow-processable materials onto thermoplastic frames to provide an elastomeric seal on the frame is difficult to control and difficult to accurately throttle the distribution of the flow-processable material in the mold. However, the inventors have discovered a solution by using a reservoir region and a runner region in the seal mold to provide the flow-processable material directly on the frame through a through-hole in the frame, provided the hydraulic diameter of the runner region is less than the reservoir region. This method has several advantages.

First, the flow-processable material can be easily provided to both sides of the frame in one step and from only one side of the mold by feeding the flow-processable material through the through-hole in the sealing frame in a region of the frame that is spaced away from the MEA and the manifold (i.e., the through-hole is not in contact with the MEA or the manifold). This eliminates the need for a two-step approach of providing the flow-processable material on the frame (injection molding an elastomeric seal on each side of the laminate in two separate steps), or, in a single step, the need of providing the flow-processable material from both the top and bottom molds. Furthermore, the flow-processable material is not in contact with the MEA and, thus, when using materials such as silicones, membrane degradation due to mobile siloxanes formed during fuel cell operation is reduced or eliminated. In addition, because the elastomeric seal is provided directly on both sides of the frame rather than as a separate elastomeric seal that is placed between the frame and the adjacent flow field plate during fuel cell assembly, a separate step of placing the elastomeric seal into the fuel cell and aligning the seal between the frame and the flow field plate, and difficulties associated therewith, are eliminated.

Second, the reservoir region is sized such that it provides a low flow resistance compared to the runners so that the flow of the flow-processable material is more even through the through-hole and into the runners on the first and second sides of the frame during processing. If the reservoir is too small or non-existent (i.e., a reservoir is not used), it is possible that flow would go much faster through the runners on the first side of the frame than the runners on the second side of the frame, causing uneven filling in the runners on either sides of the frame. For example, the reservoir may range from about 1 millimeter in diameter and about 150 microns in cross-sectional height (or thickness) on one side of the frame, to about 5 millimeters in diameter and about 1 millimeter in cross-sectional height (or thickness). In addition, the reservoir diameter is larger than the through-hole diameter to allow for misalignment tolerance between the through-hole in the frame and the seal mold. While the reservoir may provide some physical "locking" feature for the frames, the small size of the reservoir limits the amount of physical "locking" that can be provided.

Third, by using a runner region with a hydraulic diameter that is less than the reservoir from which the flow-processable material is provided, it allows for better throttle control of the silicone material into the seal bead region because the large pressure drop of the runner equalizes the resistance of the flow from the injector to the top runner (runner 28*a*) and elastomeric seal bead 8*a*, and the flow from the injector to the bottom runner (runner 28*b*) and elastomeric seal bead 8*b*.

One skilled in the art will appreciate the runner and the reservoir are sized to provide improved control of the flow-processable material during manufacturing, and, thus, are not necessarily sized to provide a sealing function against the adjacent flow field plate. Because the runner and the reservoir do not seal against the flow field plates, the runner and the reservoir are shorter than the elastomeric seal bead that circumscribes the active area of the MEA as well as the manifolds. In some embodiments, the runner and the reservoir do not physically contact the adjacent flow field plate under fuel cell stack compression so as not to impact seal bead stress and lifetime. For example, the runner is shorter in cross-section than the reservoir and the seal, typically less than about half the height of the seal bead, but should not be so small that the flow-processable material cures in the runner before being fed to the seal region. For instance, the cross-sectional height of the runner should be at least about 50 microns but less than about 1.5 millimeters.

In specific embodiments, the cross-sectional height of the runner is about 50 microns to about 500 microns. In addition, as discussed above, the dimensions of the runner are such that its hydraulic diameter is less than the hydraulic diameter of the reservoir. Furthermore, the through-hole should also be sized to generate very little flow restriction compared to what the runners generate to avoid influencing flow distribution when the flow-processable material is injected into the reservoir region. For example, the through-hole diameter may range from about 200 microns to 4 millimeters. In specific embodiments, the through-hole diameter may range from about 400 microns to about 2 millimeters.

To seal an MEA and the manifolds, a number of through-holes may be used throughout the inactive parts of the frame. One skilled in the art will readily determine the locations of the through-holes and the number of runners extending from each of the reservoirs in each of the through-holes, which will depend on the path lengths of the seal bead around the periphery of the MEA and the manifolds, as well as the size of the runners. If more than one runner extends from the same reservoir, the runners may be sized differently from each other, depending on the desired flow characteristics for the part of the seal to which they are connected, such as, but not limited to, the distance to the seal bead and the volume of the seal bead. Furthermore, runners on either side of the frames do not need to be the same size or aligned.

Any suitable material may be used for the frame and the flow processable seal material. For example, the frame may be a thermoplastic material, such as polyethylene, polypropylene, polytetrafluoroethylene (PTFE), polyvinylidene fluoride (PVDF), polyethylene napthalate (PEN), polyamide, polyimide, polyurethane, and polyester, and other materials known in the art that would be suitable as the frame material. The frame typically comes in sheets, tapes, films, or preforms, and may have a thickness of about 25 microns to about 300 microns. The flow-processable seal material for the elastomeric seal may be silicone, ethylene propylene diene terpolymer (EPDM), fluororubbers, perfluororubbers, chloroprene rubbers, fluorosilicone elastomers, polyisobutylate (PIB), ethylene propylene rubber (EPR), and thermoplastic rubbers (TPR), and other materials known in the art that would be suitable as the flow processable seal material. By sealing the periphery of the MEA with a thermoplastic frame, and then providing an elastomeric seal bead on the frame so that the elastomeric material is physically separated from the MEA, MEA degradation related to the degradation of the elastomeric seal material is substantially reduced.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

This application also claims the benefit of U.S. Provisional Patent Application No. 62/115,548, filed Feb. 12, 2015, and is incorporated herein by reference in its entirety.

The invention claimed is:

1. A sealed membrane electrode assembly for a fuel cell comprising:
   a frame around a periphery of a membrane electrode assembly to form a framed membrane electrode assembly, the frame including a first side and an opposing second side and fluidly sealing the periphery of the membrane electrode assembly;
   a through-hole in the frame, wherein the through-hole is spaced away from the membrane electrode assembly;
   a reservoir extending through the through-hole from the first side to the opposing second side of the frame, the reservoir being made of flow processable seal material; and
   at least one runner and a seal bead on the first side of the frame, the runner and the seal bead being made of a flow processable seal material;
   wherein substantially all of the flow processable seal material is physically separated from the membrane electrode assembly;
   wherein the runner connects the reservoir to the seal bead;
   wherein a hydraulic diameter of the at least one runner is less than a hydraulic diameter in any diametrical plane of the reservoir, and the at least one runner and the reservoir are shorter in cross-sectional height than the seal bead; and
   wherein the flow processable seal material is different than the frame material.

2. The sealed membrane electrode assembly of claim 1 wherein the frame comprises a thermoplastic material.

3. The sealed membrane electrode assembly of claim 1 wherein the flow processable seal material of the reservoir and the flow processable seal material of the at least one runner and seal bead each comprise a thermosetting liquid injection moldable compound.

4. The sealed membrane electrode assembly of claim 1 wherein the cross-sectional height of at least one runner is less than about half of the cross-sectional height of the seal bead.

5. The sealed membrane electrode assembly of claim 1, further comprising at least one manifold in the frame on the periphery of the membrane electrode assembly, the seal bead circumscribing the at least one manifold.

6. The sealed membrane electrode assembly of claim 5 wherein the through-hole is offset from membrane electrode assembly and the at least one manifold.

7. The sealed membrane electrode assembly of claim 1, further comprising at least one runner and a seal bead on the opposing second side of the frame.

8. A device, comprising:
   a frame around a periphery of a membrane electrode assembly to form a framed membrane electrode assembly, the frame fluidly sealing the periphery of the membrane electrode assembly;
   a plurality of seal regions on a first side and a second side of the frame, a first group of the plurality of seal regions being spaced from a second group of the plurality of seal regions by the membrane electrode assembly, each seal region, including:
   a through hole that extends from the first side to the second side of the frame;
   a first volume that surrounds the through hole, the first volume having a first dimension in a first direction;
   a second volume that is coupled to the first volume, the second volume having a second dimension in the first direction, the second dimension being less than the first dimension; and
   a third volume that is coupled to the second volume, the third volume having a third dimension in the first direction, the third dimension being greater than the second dimension, the second volume being between the first and the third volumes, the first, second, and third volume being filled with a flow processable seal material;

wherein substantially all of the flow processable seal material is physically separated from the membrane electrode assembly; and wherein the flow processable seal material is different than the frame material.

9. The device of claim 8, further comprising a plurality of manifolds, a first group of the plurality of manifolds being spaced from a second group of the plurality of manifolds by the membrane electrode assembly and the plurality of seal regions.

10. The device of claim 9 wherein the first group of the plurality of seal regions is between the first group of the plurality of manifolds and the membrane electrode assembly.

11. The device of claim 10 wherein the second group of the plurality of seal regions is between the second group of the plurality of manifolds and the membrane electrode assembly.

12. A fuel cell, comprising:
a membrane electrode assembly;
a frame that surrounds a periphery of the membrane electrode assembly to form a framed membrane electrode assembly, the frame fluidly sealing the periphery of the membrane electrode assembly;
a through-hole that extends through the frame; and
a seal including a reservoir that extends through the through-hole, a runner coupled to the reservoir, and a seal bead coupled to the runner, the reservoir, the runner, and the seal bead formed of a flow processable seal material;

wherein substantially all of the flow processable seal material is physically separated from the membrane electrode assembly;

wherein a hydraulic diameter of the runner is less than a hydraulic diameter in any diametrical plane of the reservoir;

wherein the runner and the reservoir are shorter in cross-sectional height than the seal bead; and wherein the flow processable seal material is different than the frame material.

13. The fuel cell of claim 12 wherein the cross-sectional height of the runner is less than about half of the cross-sectional height of the seal bead.

14. The fuel cell of claim 13, further comprising at least one manifold in the frame on a periphery of the membrane electrode assembly, the seal bead circumscribing the at least one manifold.

15. The fuel cell of claim 14 wherein the through-hole is offset from membrane electrode assembly and the at least one manifold.

16. The fuel cell of claim 14 wherein the runner is a first runner on a first side of the frame and the seal bead is a first seal bead of the first side of the frame, and the fuel cell further comprises a second runner on a second side of the frame opposite to the first side of the frame and a second seal bead on the second side of the frame.

* * * * *

UNITED STATES PATENT AND TRADEMARK OFFICE
CERTIFICATE OF CORRECTION

PATENT NO. : 11,088,373 B2
APPLICATION NO. : 15/550758
DATED : August 10, 2021
INVENTOR(S) : Ian Stewart et al.

It is certified that error appears in the above-identified patent and that said Letters Patent is hereby corrected as shown below:

In the Claims

Column 10, Claim 14, Line 17:
"The fuel cell of claim 13," should read: -- The fuel cell of claim 12, --.

Column 10, Claim 16, Line 24:
"The fuel cell of claim 14" should read: -- The fuel cell of claim 12 --.

Signed and Sealed this
Twenty-fifth Day of October, 2022

Katherine Kelly Vidal
*Director of the United States Patent and Trademark Office*